United States Patent
Dultz et al.

(10) Patent No.: US 6,941,048 B2
(45) Date of Patent: Sep. 6, 2005

(54) OPTICAL FIBER TRANSMISSION LINK HAVING PASSIVE, DIRECTIONALLY DEPENDENT ATTENUATION

(75) Inventors: Wolfgang Dultz, Frankfurt/M. (DE); Volker Maier, Mühlheim (DE); Jörg Happ, Grossenlüder (DE); Werner Frank, Solnhofen (DE)

(73) Assignee: Deutsche Telekom AG, Bonn (DE)

( * ) Notice: Subject to any disclaimer, the term of this patent is extended or adjusted under 35 U.S.C. 154(b) by 309 days.

(21) Appl. No.: 10/204,785

(22) PCT Filed: Jan. 24, 2001

(86) PCT No.: PCT/EP01/00765

§ 371 (c)(1),
(2), (4) Date: Nov. 20, 2002

(87) PCT Pub. No.: WO01/61398

PCT Pub. Date: Aug. 23, 2001

(65) Prior Publication Data

US 2003/0165297 A1 Sep. 4, 2003

(30) Foreign Application Priority Data

Feb. 18, 2000 (DE) .......................................... 100 07 379

(51) Int. Cl.$^7$ ................................................ G02B 6/26
(52) U.S. Cl. .......................................... 385/50; 385/28
(58) Field of Search ........................... 385/50, 33, 134, 385/49, 31, 141, 28, 65, 64, 123, 126, 135, 15

(56) References Cited

U.S. PATENT DOCUMENTS 5,077,815 A   12/1991   Yoshizawa et al.
5,416,862 A   5/1995    Haas et al.
5,664,039 A * 9/1997    Grinderslev et al. .......... 385/65
6,330,382 B1 * 12/2001  Harshbarger et al. ......... 385/28
6,476,951 B1 * 11/2002  White ......................... 398/141
6,496,620 B1 * 12/2002  Chen et al. .................... 385/31
6,516,121 B2 * 2/2003   Laor ............................ 385/49
6,553,172 B2 * 4/2003   Lortie et al. ................. 385/134
6,748,137 B2 * 6/2004   Wolak et al. .................. 385/33

FOREIGN PATENT DOCUMENTS

| DE | 198 35 681 | 3/2000 |
| EP | 0 361 498  | 4/1990 |
| EP | 0770 890   | 5/1997 |
| WO | WO 97/33390 | 9/1997 |

OTHER PUBLICATIONS

*Imai, H.; Applications of Perfluorinated Polymer Fibers to Optica Transmission Proceedings of Seventh International Plastics Optical Fiber, Fujitsu Laboratories Ltd., Sep. 22, 1997, pp. 29–30; xp–000863521.
*Patent Abstracts of Japan, JP 56–156809 abstract (Nippon Telegr & Teleph Corp, Dec. 3, 1981), vol. 006, No. 038, Mar. 9, 1982.

* cited by examiner

Primary Examiner—Thien M. Le
(74) Attorney, Agent, or Firm—Kenyon & Kenyon

(57) ABSTRACT

To provide directionally dependent attenuation for an optical information transmission link using simple means without the use of an active component, it is proposed to couple two optical waveguides (1, 2) having different core diameters to one another, the core diameter of the second fiber (2) being at least six times greater than the core diameter of the first fiber (1). In this manner, it is achieved that the conduction of light signals in a predefined direction is attenuated by at least the factor 30, while, on the other hand, the light propagating in the reverse direction, is attenuated very slightly.

6 Claims, 1 Drawing Sheet

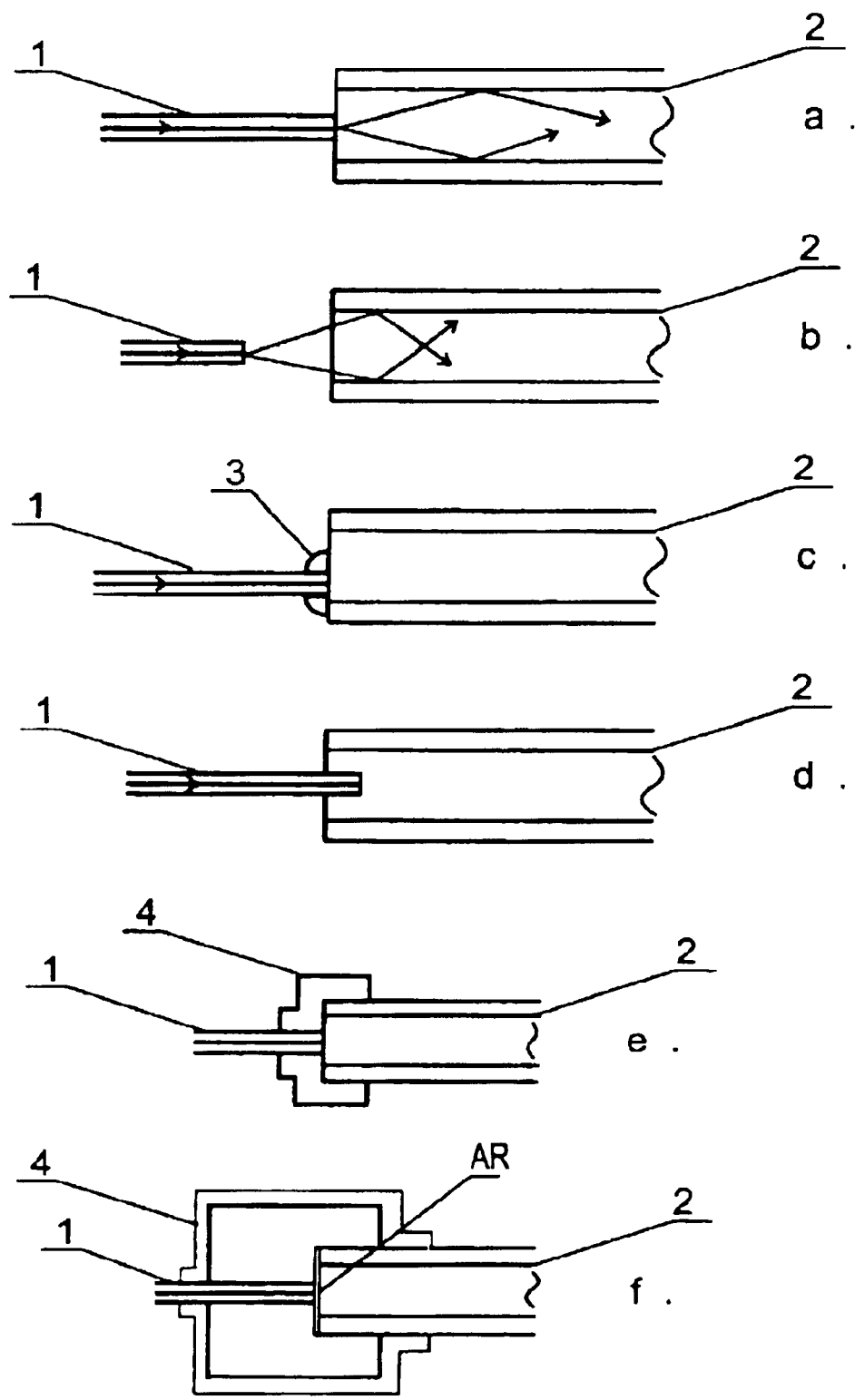
Fig. 1a-f.

OPTICAL FIBER TRANSMISSION LINK HAVING PASSIVE, DIRECTIONALLY DEPENDENT ATTENUATION

The present invention is directed to an optical information transmission link according to the definition of the species in Claim 1, as well as to a method for its manufacture.

In comparison to copper cables, optical waveguides offer a virtually unlimited bandwidth for the transmission of information. Sophisticated technologies, such as wavelength division multiplex methods, permit ever higher transmission rates for waveguides of this kind. For that reason, in the long-range transmission sector, the transmission routes of today's modern telecommunications networks use optical fiber cables almost exclusively. A further benefit of the optical-fiber-cable transmission links lies in the repeater spacing, which is many times greater than that required for copper cables.

Long-term plans in the telecommunications sector call for building a global fiber-optic network that will extend to the direct proximity of the customer. Depending on the particular methods, the signals are carried in the distribution and return directions, either over the same optical waveguides or over separate fibers. When setting up the backward channel, special consideration must be given to the fact that a private in-house network can cause considerable interference in the non-proprietary telecommunications network. This can be due, for example, to insufficient shielding of the in-house cabling or to incorrectly performed installations.

If two fibers are used to form the end subscriber connection, then the fiber assigned to the distribution channel must be substantially excluded from conducting the light injected into the fiber by the end subscriber.

To prevent or at least substantially attenuate the light conduction in one direction, related art methods make use of expensive components, such as Faraday isolators. These considerably increase the cost of construction of the signal-transmission route.

The object of the present invention is, therefore, to provide an information transmission link based on optical waveguides, which will reliably suppress the conduction of light signals in a predefined direction without the use of active components.

The present invention achieves this technical objective by providing an optical information transmission link having the features of Claim 1 and, respectively, a method for its manufacture according to Claim 6.

In a most surprisingly simple way, by coupling two optical fibers having very different diameters, it is achieved by the present invention that the light being conducted in a predefined direction is attenuated by at least a factor of 30, while, on the other hand, the light propagating in the reverse direction, is attenuated very slightly.

The attenuation in the predefined direction is approximately equal to the ratio between the cross-sectional surfaces of the light-conducting cores of the two fibers; thus, for the attenuation aspired to, a core diameter ratio of six suffices. The implementation of this "one-way coupling" renders superfluous the use of expensive, active components. In the example given here, to attain the desired effect, the optical waveguide having the larger diameter is placed at the end subscriber side.

The joining of the two optical fibers having substantially different diameters is relatively uncritical to the adjustment. In particular, a non-axial alignment of the end faces of the two fibers hardly diminishes the coupling of the light from the fiber having the small diameter into the fiber having the large diameter, thereby greatly simplifying the manufacturing of the optical information transmission link according to the present invention, and, at the same time, however, hardly influencing the attenuation of the light conduction in the opposite direction. To one skilled in the art, it is understandable, however, that the best coupling is attainable when the fibers are aligned axially and centrically.

Furthermore, the information transmission link according to the present inventions advantageously offers the end subscriber the capability of connecting an additional optical waveguide to the information transmission link simply and inexpensively. The relatively large diameter of the optical waveguide on the end subscriber side facilitates a coupling in uncomplicated fashion to a further optical waveguide having the same diameter, for example for purposes of in-house cabling. There is no need for an expensive adjustment when joining the two optical waveguides having a relatively large diameter, especially in comparison to the diameter of a monomode glass fiber.

An information transfer via the optical information transmission link according to the present invention is particularly advantageous with regard to the provisioning costs when the second fiber is a multimode fiber, in particular a plastic multimode fiber. Already today, fibers of this kind are able to be utilized as laboratory prototypes for the spectral region of the second (about 1300 nm) and of the third (about 1500 nm) optical window of glass fibers. Accordingly, these modern plastic fibers are excellently suited as second waveguides for the information transmission link according to the present invention when the first fiber is a thin glass fiber, in particular a monomode glass fiber, since, in the future, modern plastic fibers will also be able to be utilized in the standard spectral regions of conventional glass fibers.

The relatively large diameter, of, for example, about 1 mm, permits simple splices to be made by bonding the fibers, without entailing the expensive adjustment and fusing required for monomode glass fibers. Their very large diameter in relation to the optical diameter of monomode glass fibers, permits an attenuation by the factor of 100 or more, of the light coupled by the end subscriber into the public telecommunication network, or into any other network.

Because of the different materials of the optical fibers to be coupled in the optical information transmission link according to the present invention, the design of the transition between the two fibers is also simplified in comparison to the that between two glass fibers. On the one hand, the two fibers may be simply joined, for instance bonded, to one another by their end faces. As mentioned, the substantial difference between the optical diameters means that a high degree of care does not need to be exercised when aligning the two fibers to one another. An acentric coupling or a tilting of the two fiber end faces relatively to each other has only little negative effect on the coupling of the light from the glass fiber to the plastic fiber.

To minimize the reflecting light into the fiber having the small core diameter, an antireflection coating may be applied to the end face of the multimode fiber.

When the two fibers having different core diameters are joined, under certain conditions, light may emerge from the fiber having the larger diameter, at the end face, and be reflected back into the same again, since the end faces of both fibers do not completely overlap one another. This disadvantage may be overcome in a surprisingly simple way by securing a transition flange to the fibers in the region of the coupling, the flange being designed as a light trap and, thus, fulfilling both a retaining as well as a shading function.

It is especially beneficial when the glass fiber extends at the transition into the end face of the plastic fiber. In a set-up of this kind, there is no need for any external holding devices or bonding. The transition may be achieved in accordance with the present invention solely be heating either one fiber or both, and by moving them toward one another until the glass fiber extends into the plastic fiber. In this context, it is equally possible that the glass fiber is pressed into the plastic fiber or, conversely, that the plastic fiber is moved toward the glass fiber. By mutually heating the fibers in the region of their end faces or the member adjoining the two fibers, a close bond may advantageously be formed between the plastic fiber and the glass fiber in the region of the contact surfaces.

The present invention is elucidated in the following on the basis of a description of a few specific embodiments, reference being made to the attached drawing, whose FIGS. 1a–f show the transition region from a monomode glass fiber and a multimode plastic fiber, for various specific embodiments of the optical information transmission link according to the present invention.

In the specific embodiment of the optical information transmission link according to the present invention shown in FIG. 1a, the one end of a monomode glass fiber 1 is retained centrically and axially with respect to a multimode plastic fiber 2 by a retaining device (not shown), the end faces of the two fibers contacting one another. Thus, the light from glass fiber 1 may enter into plastic fiber 2, to be relayed by the same into plastic fiber 2, while light from the plastic fiber is only able to enter to a very small degree into the glass fiber.

In the specific embodiment shown in FIG. 1b, the one end of a monomode glass fiber 1 is held at a distance from and axially and centrically with respect to a multimode plastic fiber 2. In this instance, care must be taken that the mode field diameter of single-mode fiber 1 at the location of the end face of plastic fiber 2 is smaller than or equal to the core diameter of plastic fiber 2. In another specific embodiment of the optical information transmission link according to the present invention, a glass fiber 1 is cemented to a plastic fiber 2 using an adhesive 3, the end faces of the two fibers being in contact; see FIG. 1c. In the illustrated example, both fibers are in an acentric contact.

In the detail shown in FIG. 1d of another specific embodiment of the optical information transmission link according to the present invention, a monomode glass fiber extends into the multimode plastic fiber. The transition is produced by heating both the glass fiber as well as the plastic fiber in the region of their end faces. In a corresponding device, while maintaining the energy supply, the glass fiber is pressed, in axial alignment, into the plastic fiber. Once the coupling site has cooled, both fibers are permanently joined to one another.

A durable bond between the two fibers may also be achieved with the aid of a transition flange 4, as shown in FIG. 1e.

As shown in FIG. 1f, this flange 4 may also be designed as a light trap, in order to prevent the light, coming from the plastic fiber, from being reflected back into the same. For this reason, the parts of the flange facing the end face of the fiber may be blackened. Furthermore, in this specific embodiment of the present invention, an antireflection coating made up of a plurality of layers may be applied to the end face of the multimode plastic fiber, in order to reduce the light components reflected off of the end face back into the plastic fiber.

What is claimed is:

1. An optical information transmission link, which, without the use of active components, reliably suppresses the conduction of light signals in a predefined direction, comprising:

at least one first and one second optical fiber, the optical fibers being rigidly coupled to one another at a transition, wherein the core diameter of the second fiber is at least six times greater than the core diameter of the first fiber, wherein the first fiber is one of a glass fiber and a monomode glass fiber, and the second fiber is one of a multimode fiber and a plastic multimode fiber, and wherein both fibers, aligned to one another at the transition, are held by a flange, and the flange is designed as a light trap, the end face of the fiber having the larger core diameter having an antireflection coating.

2. The optical information transmission link of claim 1, wherein the glass fiber extends with its end face into the plastic fiber.

3. An optical information transmission link, which, without the use of active components, reliably suppresses the conduction of light signals in a predefined direction, comprising:

at least one first and one second optical fiber, the optical fibers being rigidly coupled to one another at a transition, wherein a core diameter of the second fiber is at least six times greater than a core diameter of the first fiber, and wherein the optical fibers bonded to one another by their end faces at the transition, in particular axially and centrically aligned to one another, and a flange holding the at least one first and one second optical fiber aligned to one another at the transition, wherein the flange is designed as a light trap, the end face of the fiber having the larger core diameter having an antireflection coating.

4. The optical information transmission link of claim 3, wherein optical fibers are axially and centrically aligned to one another.

5. The optical information transmission link of claim 3, wherein the glass fiber extends with its end face into the plastic fiber.

6. The optical information transmission link of claim 5, wherein the first fiber is one of a glass fiber and a monomode glass fiber, and the second fiber is one of a multimode fiber and a plastic multimode fiber.

* * * * *